(12) United States Patent
Roberts et al.

(10) Patent No.: US 8,959,548 B2
(45) Date of Patent: Feb. 17, 2015

(54) PRESENTING ADVERTISEMENTS WITH VIDEO PROGRAM DESCRIPTIONS

(75) Inventors: Brian F. Roberts, Dallas, TX (US); Alex Zavatone, Irving, TX (US); Heath Stallings, Colleyville, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 430 days.

(21) Appl. No.: 12/341,104

(22) Filed: Dec. 22, 2008

(65) Prior Publication Data
US 2010/0162322 A1 Jun. 24, 2010

(51) Int. Cl.
| | |
|---|---|
| G06F 3/00 | (2006.01) |
| H04N 5/445 | (2011.01) |
| H04N 21/2665 | (2011.01) |
| H04N 21/658 | (2011.01) |
| H04N 21/81 | (2011.01) |
| H04N 21/84 | (2011.01) |
| H04N 21/8405 | (2011.01) |
| H04N 21/858 | (2011.01) |
| H04N 21/478 | (2011.01) |

(52) U.S. Cl.
CPC ....... *H04N 5/44543* (2013.01); *H04N 21/2665* (2013.01); *H04N 21/6581* (2013.01); *H04N 21/812* (2013.01); *H04N 21/84* (2013.01); *H04N 21/8405* (2013.01); *H04N 21/858* (2013.01); *H04N 21/478* (2013.01)
USPC .................................. 725/43; 725/32; 725/37

(58) Field of Classification Search
USPC .............................................. 725/32, 37, 45
See application file for complete search history.

(56) References Cited

U.S. PATENT DOCUMENTS

| 5,621,456 A * | 4/1997 | Florin et al. ..................... 725/43 |
| 6,415,437 B1 * | 7/2002 | Ludvig et al. .................... 725/41 |
| 7,328,450 B2 * | 2/2008 | Macrae et al. ................... 725/42 |
| 8,196,166 B2 * | 6/2012 | Roberts et al. .................. 725/34 |
| 2004/0001081 A1 * | 1/2004 | Marsh .......................... 345/721 |
| 2005/0028200 A1 * | 2/2005 | Sardera ......................... 725/42 |
| 2006/0075449 A1 * | 4/2006 | Jagadeesan et al. .......... 725/113 |

* cited by examiner

*Primary Examiner* — Olugbenga Idowu

(57) ABSTRACT

A system may store program information associated with a group of video programs. The program information may include a program description associated with a particular video program of the group of video programs. The system may receive an instruction to provide the program description, read the program description in response to the received instruction, obtain an advertisement that is related to a content of the particular video program, and present the program description and the advertisement to a video display device, where the advertisement is presented adjacent to the program description on a screen of the video display device.

20 Claims, 13 Drawing Sheets

500

| 510 | 520 |
|---|---|
| PROGRAM ID | TAGS |
| PROGRAM 1 | TAG 11, TAG 12, TAG13 |
| PROGRAM 2 | TAG 21, TAG 22, TAG 23 |
| ⋮ | ⋮ |
| PROGRAM M | TAG M1, TAG M2, TAG M3 |

| 610 | 620 |
|---|---|
| TAG | ADVERTISEMENT IDS |
| TAG 1 | AD 11, AD 12, AD 13, AD 14 |
| TAG 2 | AD 21, AD 22, AD 23, AD 24 |
| ⋮ | ⋮ |
| TAG N | AD N1, AD N2, AD N3, AD N4 |

FIG. 6

PRESENTING ADVERTISEMENTS WITH VIDEO PROGRAM DESCRIPTIONS

BACKGROUND

Television is a very powerful tool for presenting information to a wide audience. This makes television a very good advertising medium. It is common to present commercials with television content. The manner in which people watch television is changing, however. For example, many television viewers watch on demand content and/or recorded content (e.g., content recorded using video recording equipment, such as a digital video recorder (DVR)). With on demand content and/or recorded content, television viewers have the opportunity to fast forward, or otherwise ignore, the commercials.

BRIEF DESCRIPTION OF THE DRAWINGS

FIG. 5 is a diagram of a table that may include associations between video programs and tags;

FIG. 6 is a diagram of a table that may include associations between tags and advertisements;

DETAILED DESCRIPTION OF PREFERRED EMBODIMENTS

Figure 1:
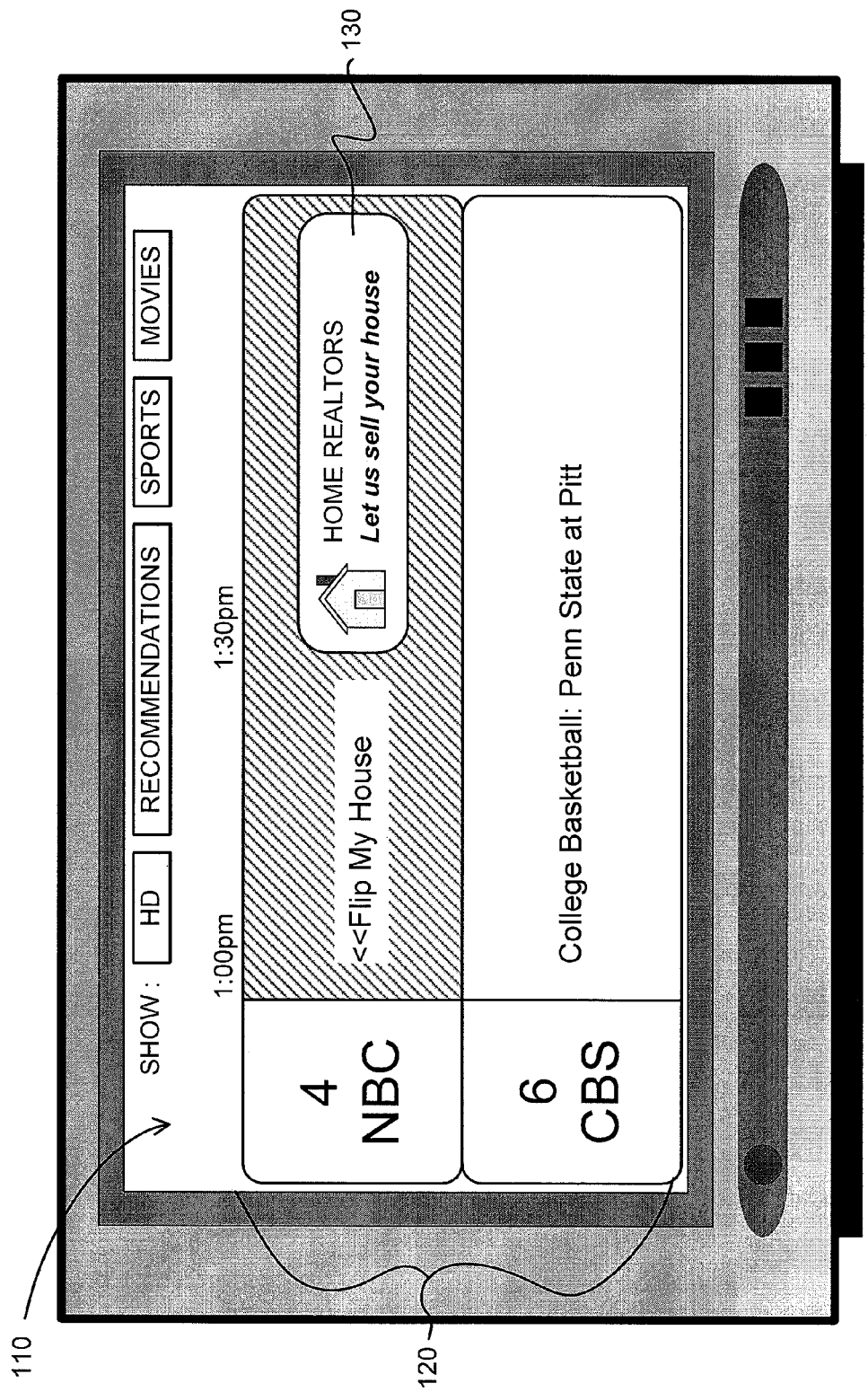
FIG. 1 is a diagram that illustrates an overview of an implementation described herein.

The following detailed description refers to the accompanying drawings. The same reference numbers in different drawings may identify the same or similar elements.

Implementations described herein may provide advertisements, which are relevant to content of video programs, in connection with descriptions of those video programs (hereinafter referred to as "video program descriptions" or, more simply as "program descriptions"). As used herein, the term "program" is intended to be broadly interpreted to include any form of visual content for which an advertisement may be provided, such as live television content, streaming web content, on-demand content (e.g., games, videos (including music videos), etc.), or recorded content (e.g., content recorded by a digital video recorder (DVR)). A "program description" may refer to any meta-data associated with a video program, such as a title, a text description of the content of the video program, an image of the video program, a list of actors, an air date of the video program, and/or other information. The program description is not intended to refer to the actual video program itself. An "advertisement" is intended to refer to any promotion or announcement of a product or service. For example, in one implementation, an advertisement may refer to a promotion or announcement associated with a product or service for sale. In another implementation, an advertisement may refer to a promotion or announcement associated with media content (e.g., a video program, music, games, etc.) available for free (e.g., to view, listen to, or play).

A program description may be presented to a user in several different forms. For example, the program description may be presented within a program guide, a program information page, a program status bar, or a recommended programs list. A "program guide" is intended to be broadly interpreted to include a listing and/or schedule of programs available for viewing or recording. The program guide need not conform to the standard list-based, time-based grid of programs available for viewing or recording. A "program information page" is intended to be broadly interpreted to include detailed information regarding a particular program. A program information page may be presented by pressing an "information" button, or the like, on a remote control. A "program status bar" is intended to be broadly interpreted to include information regarding a particular program, which typically includes less information than the program information page. A program status bar may be presented at the beginning of, at the ending of, and/or during a trick mode. A "trick mode" may refer to a mode other than a normal play mode, such as a rewind mode, a fast forward mode, or a pause mode. A "recommended programs list" is intended to be broadly interpreted to include information regarding programs recommended to a user. There are various ways that recommended programs can be identified, such as based on programs that the user previously viewed and/or recorded.

FIG. 1 is a diagram that illustrates an overview of an implementation described herein. As shown in FIG. 1, a program guide 110 may be presented on a television screen when instructed by a user. For example, program guide 110 may be presented when the user turns on his/her television, or when the user pushes a particular button on his/her remote control. Program guide 110 may include program descriptions 120 regarding video programs that are available for viewing and/or recording. The user may move a selector around within program guide 110 using, for example, buttons on a remote control. The selector is shown in FIG. 1 with shading. Thus, as shown in FIG. 1, the selector is located on program description 120 corresponding to the video program "Flip My House."

In one implementation, an advertisement 130 may be presented whenever the selector is located on a program description 120. In another implementation, advertisements, such as advertisement 130, may be presented for all (or a subset) of the program descriptions presented within program guide 110, or the portion of program guide 110 currently visible on the television screen. In either event, the content of advertisement 130 may be related to the content of the video program corresponding to program description 120 with which advertisement 130 is presented. As shown in FIG. 1, for example, the video program "Flip My House" is related to renovating and selling homes. Advertisement 130, presented in connection with program description 120 associated with the video program "Flip My House," is an advertisement for a realtor (e.g., "Home Realtors"). Thus, the content of advertisement 130 relates to the content of the video program.

In the description to follow, advertisements will be described in connection with television programs. It should be understood, however, that the description equally applies to other types of programs.

Figure 2:
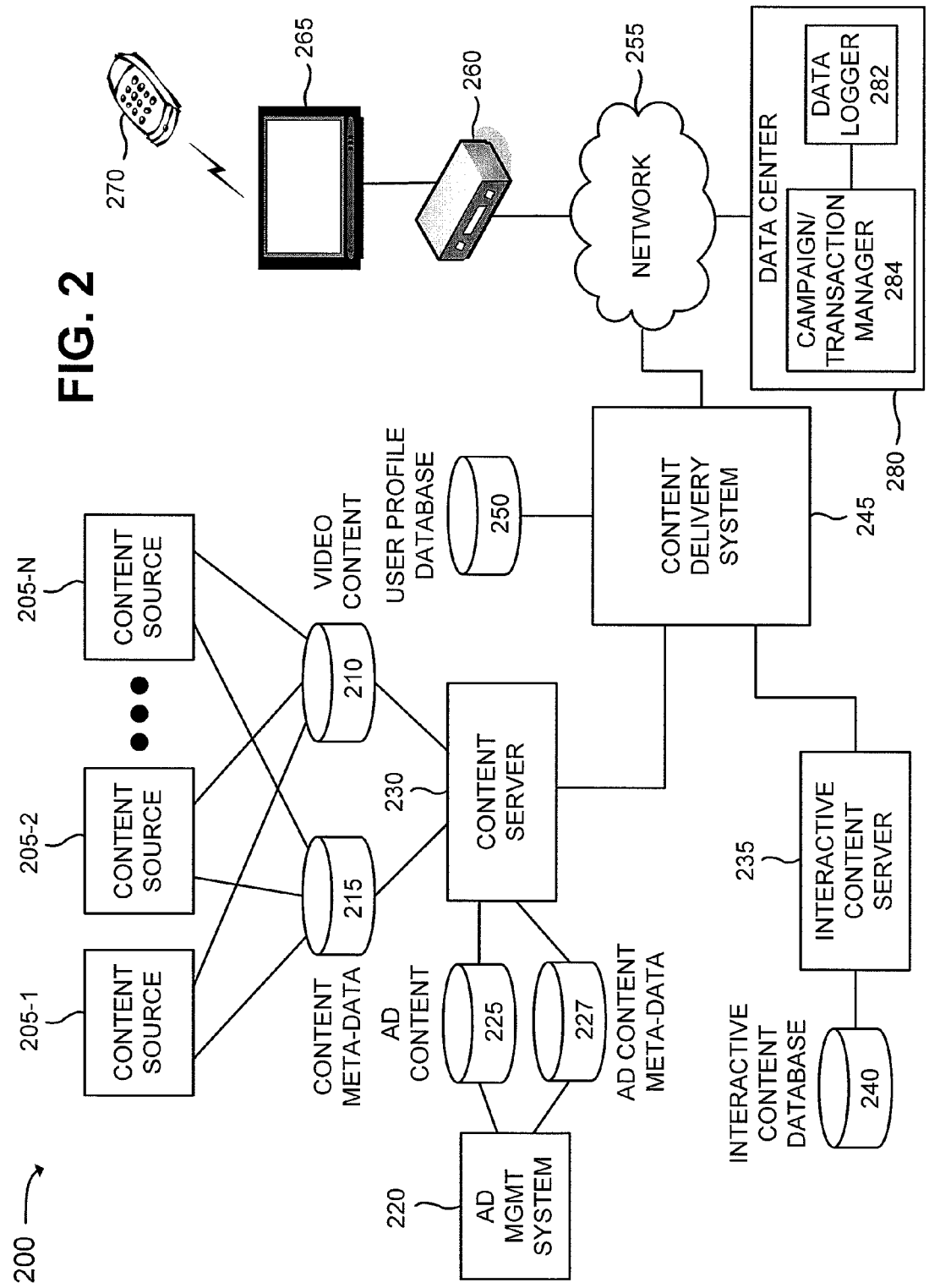
FIG. 2 is a diagram of an exemplary environment in which systems and methods described herein may be implemented.

FIG. 2 is a diagram of an exemplary environment 200 in which systems and methods described herein may be implemented. Environment 200 may include content sources 205-1, 205-2, ..., 205-N (where N≥1) (collectively referred to as "content sources 205," and individually as "content source 205"), video content database 210, content meta-data database 215, advertising (ad) management (mgmt) system 220, advertising content database 225, advertising content meta-data database 227, content server 230, interactive content server 235, interactive content database 240, content delivery system 245, user profile database 250, network 255, video client 260, video display device 265, remote control 270, and data center 280. In practice, environment 200 may include more, fewer, different, or differently arranged devices than are shown in FIG. 2. Also, two or more of these devices may be implemented within a single device, or a single device may be implemented as multiple, distributed devices. Further, while FIG. 2 shows direct connections between various devices, any of these connections can be indirectly made via a network, such as a local area network, a wide area network (e.g., the Internet), a telephone network (e.g., the Public Switched Telephone Network (PSTN) or a cellular network), or a combination of networks.

Content sources 205 may include any type or form of content provider. For example, content sources 205 may include free television broadcasters (e.g., local broadcasters, such as NBC, CBS, ABC, and Fox), for-pay television broadcasters (e.g., TNT, ESPN, HBO, Cinemax, CNN, etc.), and/or web-based content providers (e.g., streaming content from web sites). Video content database 210 may store video signals representing the video programs provided by various ones of content sources 205. Content meta-data database 215 may store meta-data associated with the video programs provided by various ones of content sources 205. The meta-data might include program descriptions, program line-ups and/or schedules, information that associates video programs to content tags (described below with regard to FIG. 5), or other information associated with the video programs in video content database 210.

Advertising management system 220 may control what advertising content is presented in connection with the video programs in video content database 210. Advertising management system 220 may store advertising content in advertising content database 225. The advertising content may include advertisements (e.g., commercials that are inserted within a program signal, long form advertisements that are not inserted within the program signal, text or graphics that are overlaid on or presented with a program description, advertisements that are presented alongside the program signal, and/or interactive advertisements), and/or links to advertisements that may be served via a network, such as the Internet. Advertising content meta-data database 227 may store meta-data associated with the advertisements in advertising content database 225. The meta-data might include scheduling information, rating information, category information, length of advertisement, classification information, expiration date of the advertisement, information that associates content tags with advertisement identifiers (described below with regard to FIG. 6), or other information that advertising management system 220 and/or content server 230 may find useful in serving and/or targeting the advertising content.

Content server 230 may include a device that is capable of controlling the serving of video programs from video content database 210, the program meta-data from content meta-data database 215, and/or the advertising content from advertising content database 225. In one implementation, content server 230 may include a content mixing engine to select information, such as video programs, program meta-data, advertising content, and/or advertisement meta-data, and mix the information together. Content server 230 may optionally also perform transcoding of the mixed information.

Interactive content server 235 may include a device that is capable of managing the serving of interactive content in association with a video program. Interactive content server 235 may retrieve interactive content from interactive content database 240. Interactive content database 240 may store interactive content and may store an association between the interactive content and the video programs and/or advertisements with which the interactive content corresponds. The term "interactive content," as used herein, may refer to content that may be presented to a user and with which the user can interact to, for example, request additional information, make a purchase, perform a search, etc. Interactive content may include content that can be continuously provided or provided when requested. Examples of types of interactive content might include special promotions or discounts, interactive advertisements, sports statistics, or offers of audio or video information for playing or purchase.

Content delivery system 245 may include a device that is capable of delivering information to a user's equipment (e.g., a user's video client 260). Content delivery system 245 may include a service adaptor component and a media relay component. The service adaptor component may control what information (e.g., what video programs and/or advertisements) to provide to which users based, for example, on user subscriptions and/or profiles. Content delivery system 245 may also include one or more on demand components that may provide on demand services (e.g., music, video, and/or games on demand). The media relay component may control the transmission of the information to the users. The media relay component may perform encoding and/or encryption functions.

User profile database 250 may store information associated with various users, such as preferences of the users, information regarding the video programs that the users selected to watch and/or record, information regarding social groups with which the users are associated and possibly preferences and/or viewing/recording habits of members of the social groups, information regarding interactive content selected by the users, and/or other information that might be useful in presenting advertisements to the users.

Network 255 may include a video signaling and distribution network to distribute the information from content delivery system 245. Network 255 may take the form of a wide area network, a local area network, an intranet, a telephone network (e.g., the Public Switched Telephone Network or a cellular network), a private network, or a combination of networks.

Video client 260 may include a device capable of receiving and processing the information from content delivery system 245 for display on video display device 265. In one implementation, video client 260 may take the form of a set top box. In another implementation, video client 260 may include a computer device, a cable card, a stationary communication device (e.g., a POTS telephone), a portable communication device (e.g., a mobile telephone or a personal digital assistant (PDA)), or the like. Video client 260 may perform decoding and/or decryption functions on information received from content delivery system 245.

Video display device 265 may include a device capable of receiving and reproducing video signals (and perhaps audio signals). In one implementation, video display device 265 may take the form of a television. In another implementation, video display device 265 may include a computer monitor, a display of a stationary communication device (e.g., a telephone) or a portable communication device (e.g., a mobile telephone or a PDA), or the like.

Remote control 270 may include a device capable of remotely controlling the operation of video client 260 and/or video display device 265. Remote control 270 may transmit infrared signals, or another type of signals, to a reader associated with video client 260 and/or video display device 265.

Data center 280 may collect information from video client 260. In one implementation, data center 280 may include a data logger 282 and/or a campaign/transaction manager 284. Data logger 282 may collect and store the information from video client 260. Campaign/transaction manager 284 may manage rules of an advertisement campaign, manage billing or connectivity to third parties for information transfer, or the like. For example, campaign/transaction manager 284 may be responsible for recording advertisement impressions (e.g., when particular advertisements are presented to a user) and/or advertisement selections (e.g., when particular advertisements are selected by a user) to facilitate the billing of advertisers. In one implementation, an advertiser may be billed a first amount for an advertisement impression and a second amount (typically greater than the first amount) for an advertisement selection.

Figure 3:
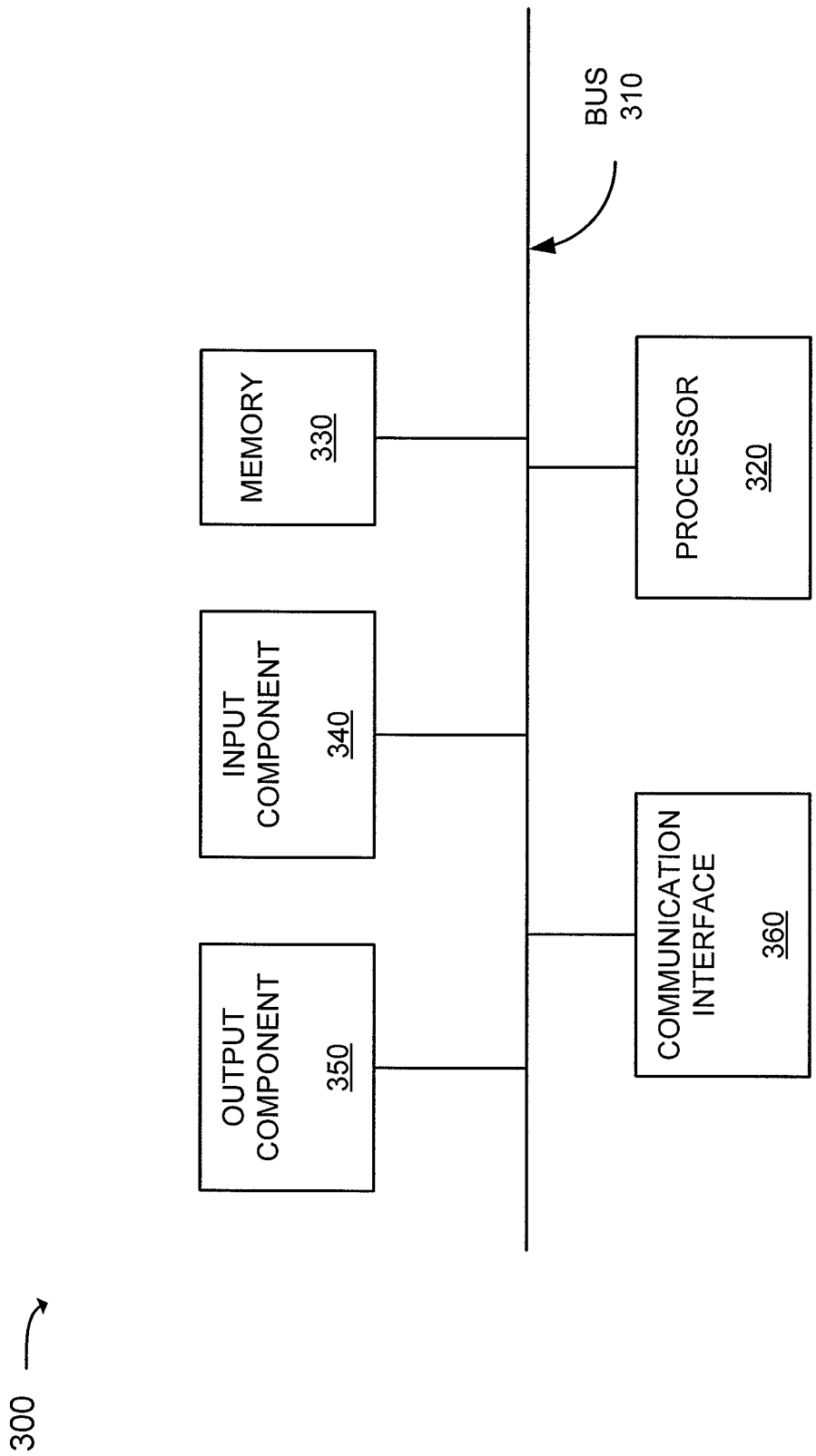
FIG. 3 is a diagram of exemplary components of a device of FIG. 2.

FIG. 3 is a diagram of exemplary components of a device 300 that may correspond to advertising management system 220, content server 230, interactive content server 235, content delivery system 245, video client 260, video display device 265, and/or data center 280. In another implementation, device 300 may include more, fewer, different, and/or differently arranged components.

As shown in FIG. 3, device 300 may include a bus 310, a processor 320, a memory 330, an input component 340, an output component 350, and a communication interface 360. Bus 310 may include a path that permits communication among the components of device 300.

Processor 320 may include a processor, microprocessor, or processing logic (e.g., an application specific integrated circuit (ASIC) or a field programmable gate array (FPGA)) that may interpret and execute instructions. Memory 330 may include any type of dynamic storage device that may store information and instructions for execution by processor 320, any type of non-volatile storage device that may store information for use by processor 320, and/or any type of removable memory device (e.g., flash memory).

Input component 340 may include a mechanism that permits an operator to input information to device 300, such as a keyboard, a keypad, a button, a switch, etc. Output component 350 may include a mechanism that outputs information to the operator, such as a display, a speaker, a light emitting diode (LED), etc. Communication interface 360 may include any transceiver-like mechanism that enables device 300 to communicate with other devices and/or systems. For example, communication interface 360 may include an Ethernet interface, an optical interface, a coaxial interface, a wireless interface, or the like.

As will be described in detail below, device 300 may perform certain operations relating to the presentation of advertisements in connection with program descriptions. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across physical memory devices.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Implementations, described herein, may present advertisements in connection with program descriptions. To facilitate the presentation of the advertisements, video client 260 and/or content server 230 may perform operations, such as those described below. Certain operations will be described as being performed by video client 260 and certain other operations will be described as being performed by content server 230. One or more of these operations may be performed by video client 260, content server 230, a combination of video client 260 and content server 230, or one or more devices separate from, or in combination with, video client 260 and/or content server 230.

Three different implementations will be described below. The three different implementations differ in the functions, or the timing of the functions, performed by video client 260 and content server 230. Other implementations are possible and the particular implementation used may be based on design considerations, network configurations, and/or connection speeds to present the user with a meaningful viewing experience.

Figure 4:
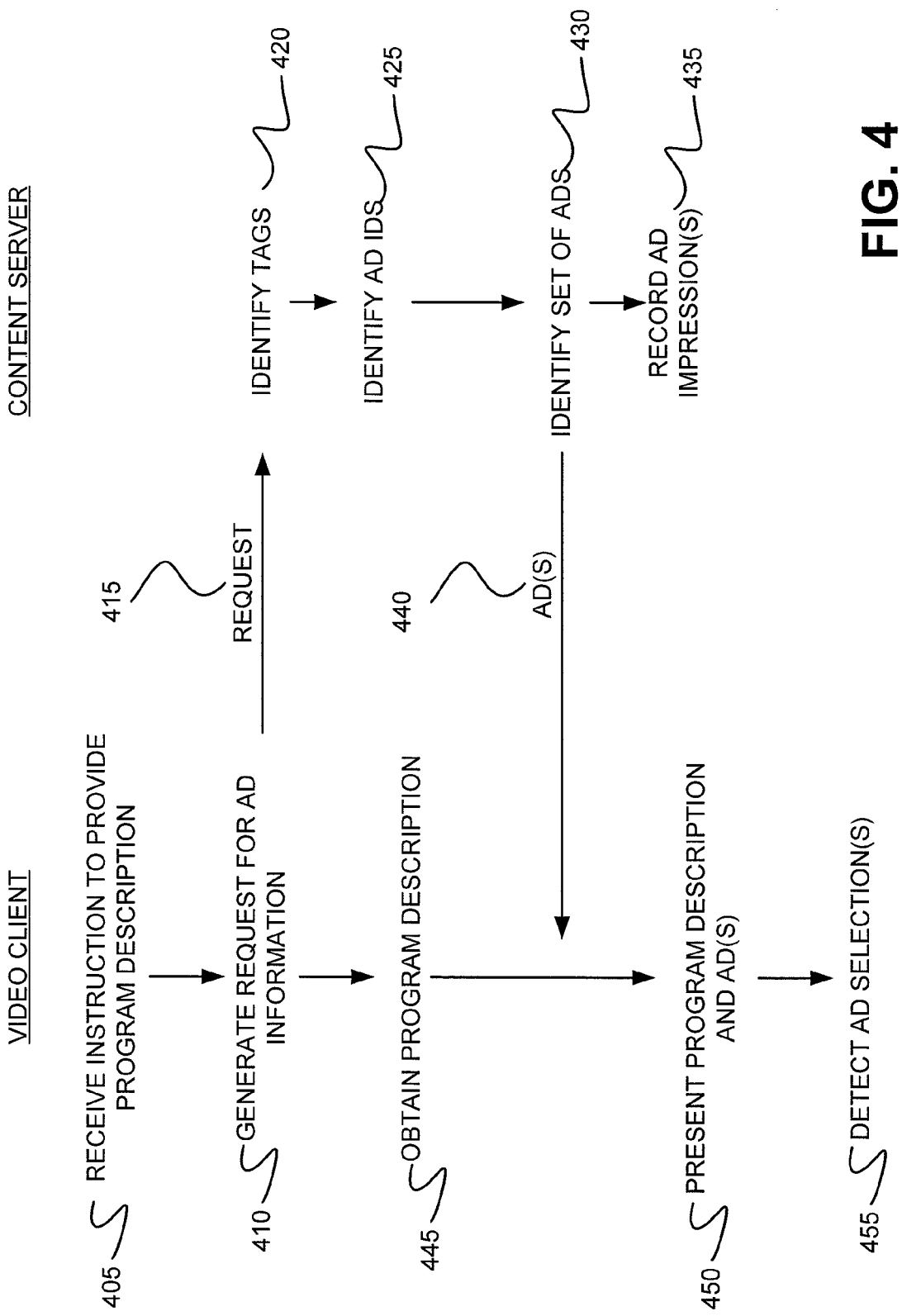
FIG. 4 is a flowchart of an exemplary process for presenting an advertisement in connection with a program description associated with a video program.

FIG. 4 is a flowchart of an exemplary process for presenting an advertisement in connection with a program description associated with a video program. In one implementation, the process of FIG. 4 may be performed by video client 260 and/or content server 230. In another implementation, the process of FIG. 4 may be performed by one or more devices either separate from, or in combination with, video client 260 and/or content server 230.

The process of FIG. 4 may begin at some point after a user turns on video display device 265. An instruction may be received to provide a program description (block 405). For example, video client 260 may receive input, from a user, instructing video client 260 to present a program description relating to one or more video programs. In one implementation, the user may instruct video client 260 to present a program guide, a program information page, a program status bar, or a recommended programs list. The user may issue the instruction by pressing one or more buttons on remote control 270 and/or one or more buttons on video client 260.

A request for advertisement information may be generated (block 410). For example, video client 260 may identify the video program associated with the program description. In one implementation, each video program, which may be presented on video display device 265, may have an associated program identifier. Each program identifier may uniquely identify a particular video program. Video client 260 may include, in the generated request, the program identifier associated with the identified video program.

In the situation where the user has instructed video client 260 to provide a program guide or a recommended programs list, video client 260 may generate a request associated with multiple video programs. For example, video client 260 may include program identifiers, associated with a group of video programs, in the request. The program identifiers may be associated with all or a subset of the video programs in the program guide or recommended programs list.

The request may be outputted (block 415). For example, video client 260 may transmit the request to content server 230. Content server 230 may analyze the request to identify the program identifier(s) contained in the request.

Tags associated with the program identifier(s), included in the request, may be identified (block 420). A "tag," as used herein, may refer to information that identifies a subject matter of a video program. For example, a tag may be a word or phrase like "football" or "sporting event." Alternatively, a tag may be a numeric (or alphanumeric) value that may be uniquely associated with a particular topic. In one implementation, content server 230 may identify the tags associated with the program identifier(s) included in the request by, for example, performing a look-up operation in a table. The table may reside, for example, in content meta-data database 215.

FIG. 5 is a diagram of a table 500 that may include associations between video program identifiers and tags. As shown in FIG. 5, table 500 may include a number of records. Each of the records may include a program identifier (ID) field 510 and a tag field 520. Program identifier field 510 may store a program identifier that, as explained above, uniquely identifies a particular video program. Tag identifier field 520 may store one or more tags that are associated with the video program corresponding to the program identifier stored in the corresponding program identifier field 510.

Returning to FIG. 4, content server 230 may use a program identifier, included in the request, as an index into table 500. Content server 230 may read the tag(s) associated with the program identifier from tag field 520 in the corresponding record in table 500.

Advertisement identifier(s), associated with the tag(s), may be identified (block 425). In one implementation, content server 230 may identify advertisement identifiers associated with the tag(s) by, for example, performing a look-up operation in a table. The table may reside, for example, in advertising content meta-data database 227.

FIG. 6 is a diagram of a table 600 that may include associations between tags and advertisements. As shown in FIG. 6, table 600 may include a number of records. Each of the records may include a tag field 610 and an advertisement identifier field 620. Tag field 610 may store a tag. Advertisement identifier field 620 may store information that identifies one or more advertisements that are associated with the tag stored in the corresponding tag field 610. The information in advertisement identifier field 620 may be a numeric (or alphanumeric) value that may be uniquely associated with a particular advertisement (or advertiser).

Returning to FIG. 4, content server 230 may use a tag as an index into table 600. Content server 230 may read the advertisement identifier(s) associated with the tag from tag field 610 in the corresponding record in table 600.

A set of advertisements may be identified (block 430). For example, content server 230 may identify all or a subset of the advertisement(s) corresponding to the advertisement identifier(s) from table 600. Content server 230 may also prioritize or filter the identified advertisement(s). Various techniques may be used to identify, prioritize, or filter the advertisement(s). For example, content server 230 may use information regarding user preferences (e.g., information in user profile database 250) to identify which advertisements to identify for the set). Content server 230 may obtain the identified advertisement(s) from, for example, advertisement content database 225 using the advertisement identifier(s).

Information regarding the identified advertisement(s) may be recorded as impression data (block 435). For example, content server 230 may store information regarding which advertisement(s) were identified by content server 230, and store this information, as impression data, for billing purposes. In one implementation, content server 230 may forward the impression data to data center 280.

The identified advertisement(s) may be outputted (block 440). For example, content server 230 may transmit the identified advertisement(s) to video client 260. When there are multiple, identified advertisements that correspond to multiple video programs, content server 230 may indicate with which video program each advertisement corresponds. For example, content server 230 may transmit the identified advertisements along with the program identifiers with which the identified advertisements are associated.

The program description may be obtained (block 445). In one implementation, video client 260 may read the program description from memory. For example, video client 260 may use the program identifier to obtain the program description. In another implementation, video client 260 may obtain the program description from content server 230. For example, video client 260 may send a request to content server 230 and obtain the program description from content server 230. Video client 260 may include the program identifier in the request. The request may be the same as, or separate from, the request that video client 260 sent in block 415.

The program description and the identified advertisement(s) may be presented (block 450). For example, video client 260 may send information to video display device 265 to cause video display device 265 to display the program description and the identified advertisement(s). In one implementation, the identified advertisement(s) may be presented as dynamic text overlaid on the program description. The identified advertisement(s) may be presented to the user in a number of different ways, some of which may depend on the manner in which the program description is to be presented.

Figure 7:
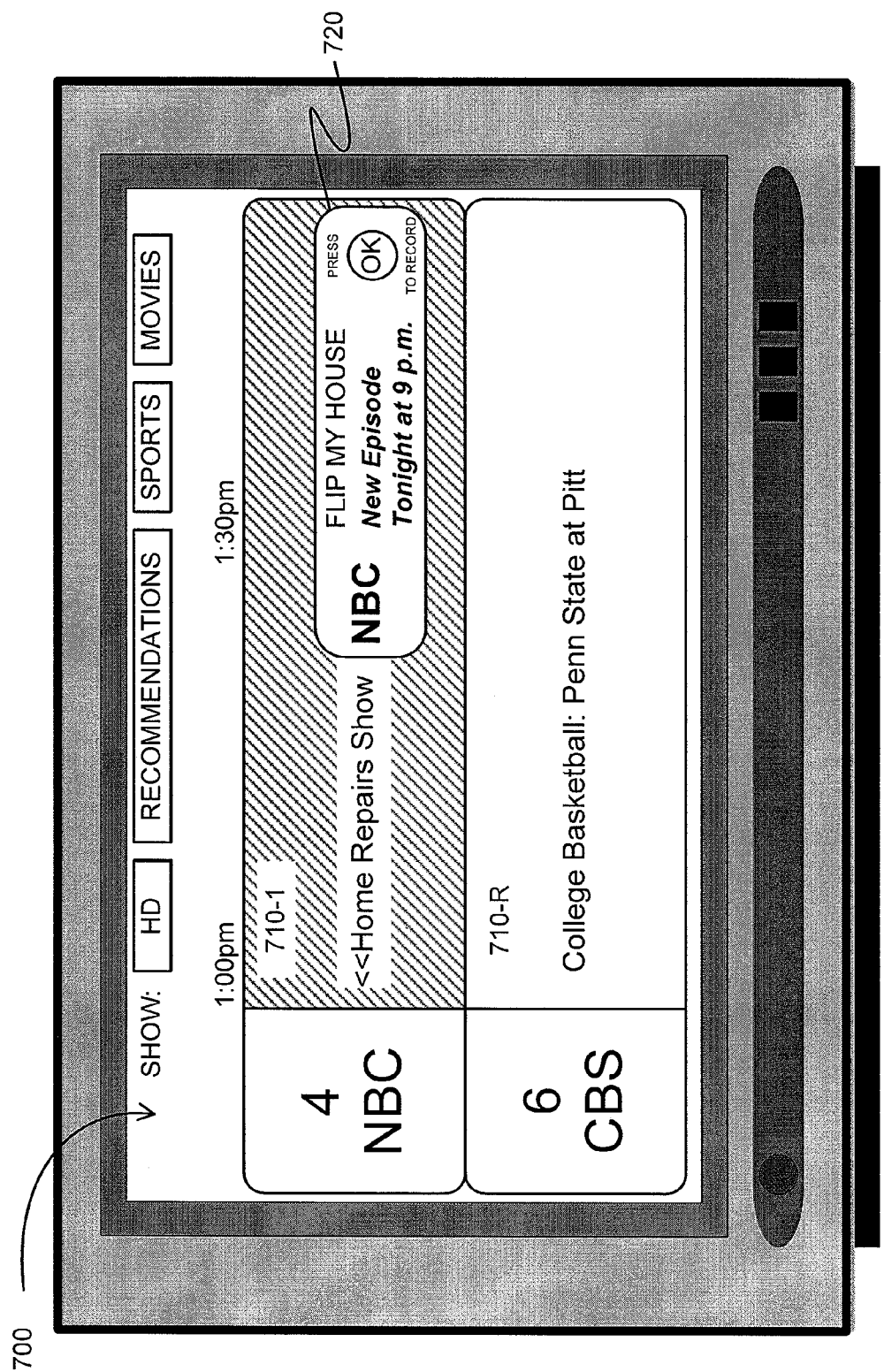
FIGS. 7-12 are diagrams of exemplary ways that advertisements can be presented.

FIGS. 7-12 are diagrams of exemplary ways that advertisements can be presented. As shown in FIG. 7, assume that multiple program descriptions 710-1, . . . , 710-R (where R≥1) are presented within a program guide 700, and that the user has moved a selector to select a video program entitled "Home Repairs Show." An advertisement 720 may be presented adjacent to program description 710-1 (e.g., within an area containing program description 710-1). As shown in FIG. 7, the content of advertisement 720 may relate to a content of the video program "Home Repairs Show" (e.g., the video program "Home Repairs Show" relates to performing home repairs, and the advertisement promotes another video program "Flip My House"—a video program relating to renovating and selling homes). As shown in FIG. 7, advertisement 720 may present an opportunity to record the promoted video program with a single press of a button on remote control 270 (e.g., the user may press the OK button on her remote control 270 to automatically schedule the promoted video program for recording). In one implementation, video client 260 may periodically change or rotate the advertisement that is presented. For example, if multiple advertisements were identified, video client 260 may periodically replace one of the identified advertisements with another one of the identified advertisements (e.g., every Z seconds, or each time program guide 700 is presented). While FIG. 7 shows that an advertisement is presented only for the selected program description, this need not be the case. An advertisement may, alternatively, be presented for all (or a subset) of the program descriptions visible within video display device 265.

Figure 8:
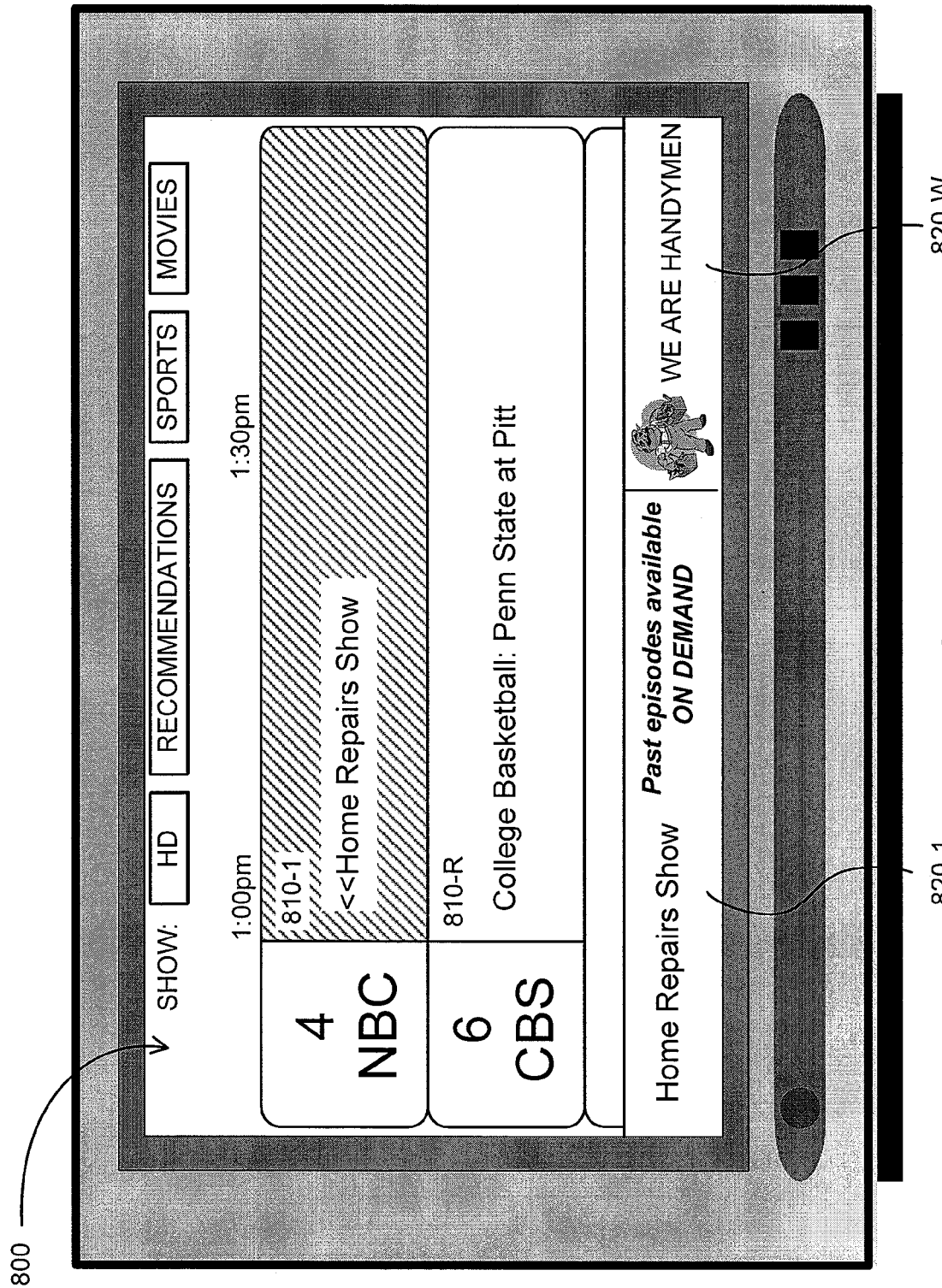

As shown in FIG. 8, assume that multiple program descriptions 810-1, . . . , 810-R (where R≥1) are presented within a program guide 800, and that the user has moved a selector to select a video program entitled "Home Repairs Show." A set of advertisements 820-1, . . . , 820-W (where W≥1) may be presented within a designated area on the screen of video display device 265. As shown in FIG. 8, for example, advertisements 820 may be presented within a data scroll, or the like, across the bottom of the screen of video display device 265.

As shown in FIG. 8, the content of advertisements 820-1, ..., 820-W may relate to a content of the video program "Home Repairs Show" (e.g., the video program "Home Repairs Show" relates to performing home repairs, one of the advertisements also relates to "Home Repairs Show" and indicates that past episodes of the video program are available as on-demand content, and another one of the advertisements relates to "We are Handymen"—a handyman service to assist in making home repairs). In one implementation, video client 260 may stream all (or a subset) of the identified advertisements within the designated area. While FIG. 8 shows that an advertisement is presented only for the selected program description, this need not be the case. An advertisement may, alternatively, be presented for all (or a subset) of the program descriptions visible within video display device 265. In this situation, it may be useful to designate the video program with which an advertisement is associated.

Figure 9:
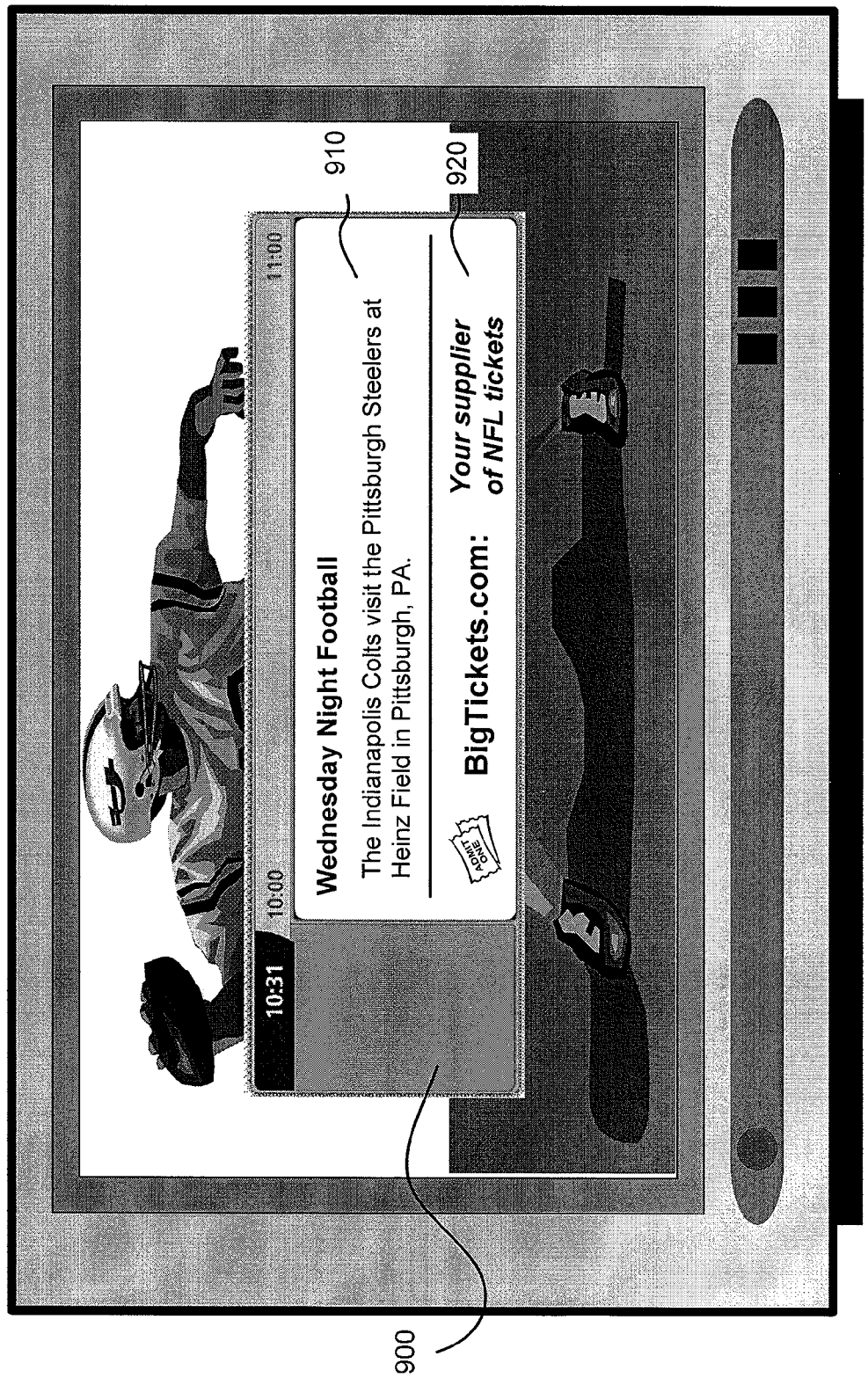

As shown in FIG. 9, assume that a program description 910 is presented within a program information page 900. Program description 910 may include a detailed description of the content of a video program. An advertisement 920 may be presented adjacent to program description 910 (e.g., within an area of program information page 900). As shown in FIG. 9, the content of advertisement 920 may relate to a content of the video program "Wednesday Night Football" (e.g., the video program "Wednesday Night Football" relates to an NFL football game, and the advertisement relates to "BigTickets.com"—an online service that sells tickets to sporting events). In one implementation, video client 260 may periodically change or rotate the advertisement that is presented. For example, if multiple advertisements were identified, video client 260 may periodically replace one of the identified advertisements with another one of the identified advertisements (e.g., every Z seconds, or each time program information page 900 is presented).

Figure 10:
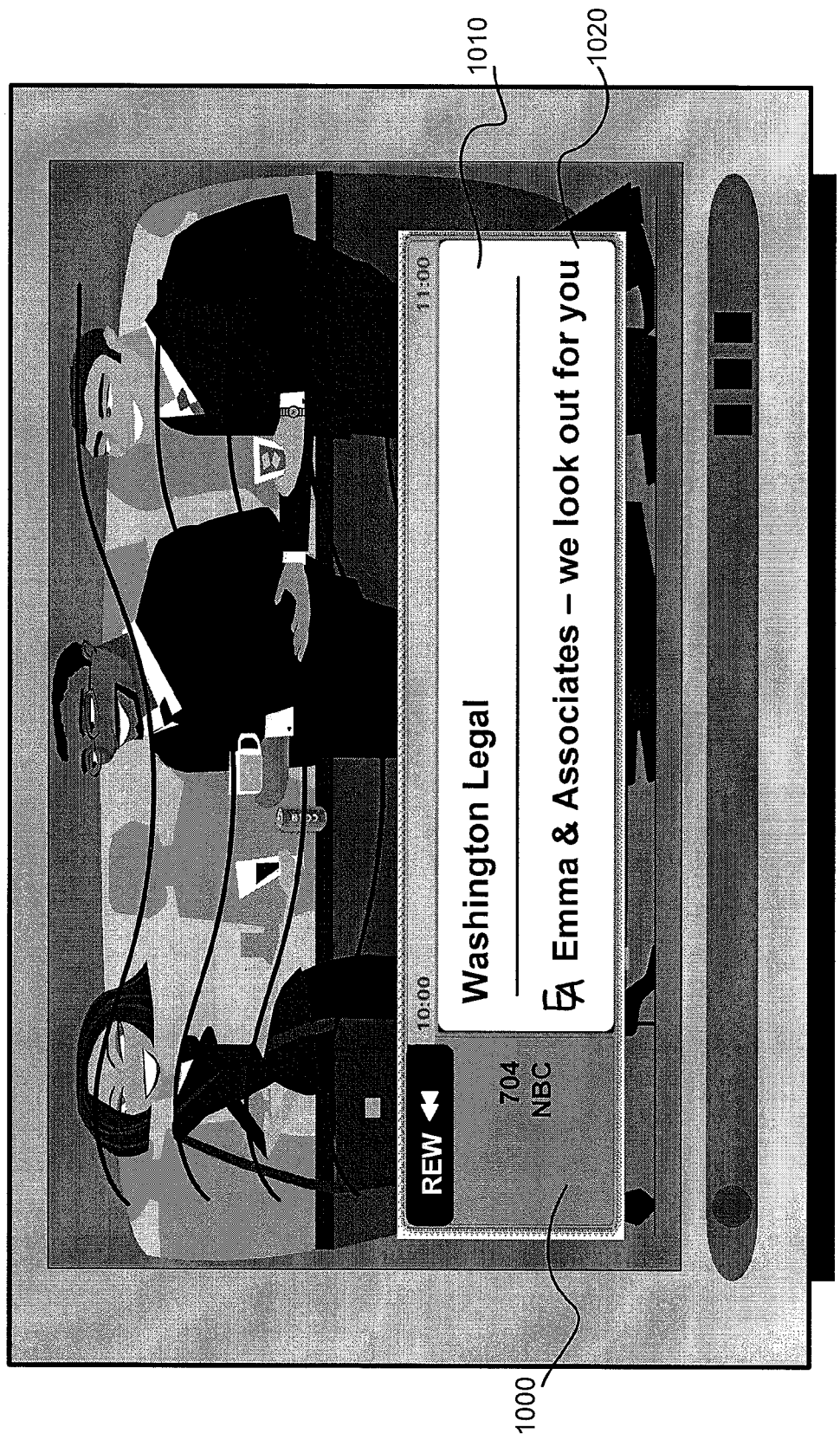

As shown in FIG. 10, assume that a program description 1010 is presented within a program status bar 1000. Program description 1010 may include a title of the content of a video program. An advertisement 1020 may be presented adjacent to program description 1010 (e.g., within an area of program status bar 1000). As shown in FIG. 10, the content of advertisement 1020 may relate to a content of the video program "Washington Legal" (e.g., the video program "Washington Legal" relates to a legal program, and the advertisement relates to "Emma & Associates"—a firm providing legal services). In one implementation, video client 260 may periodically change or rotate the advertisement that is presented. For example, if multiple advertisements were identified, video client 260 may periodically replace one of the identified advertisements with another one of the identified advertisements (e.g., every Z seconds, or each time program status bar 1000 is presented).

Figure 11:
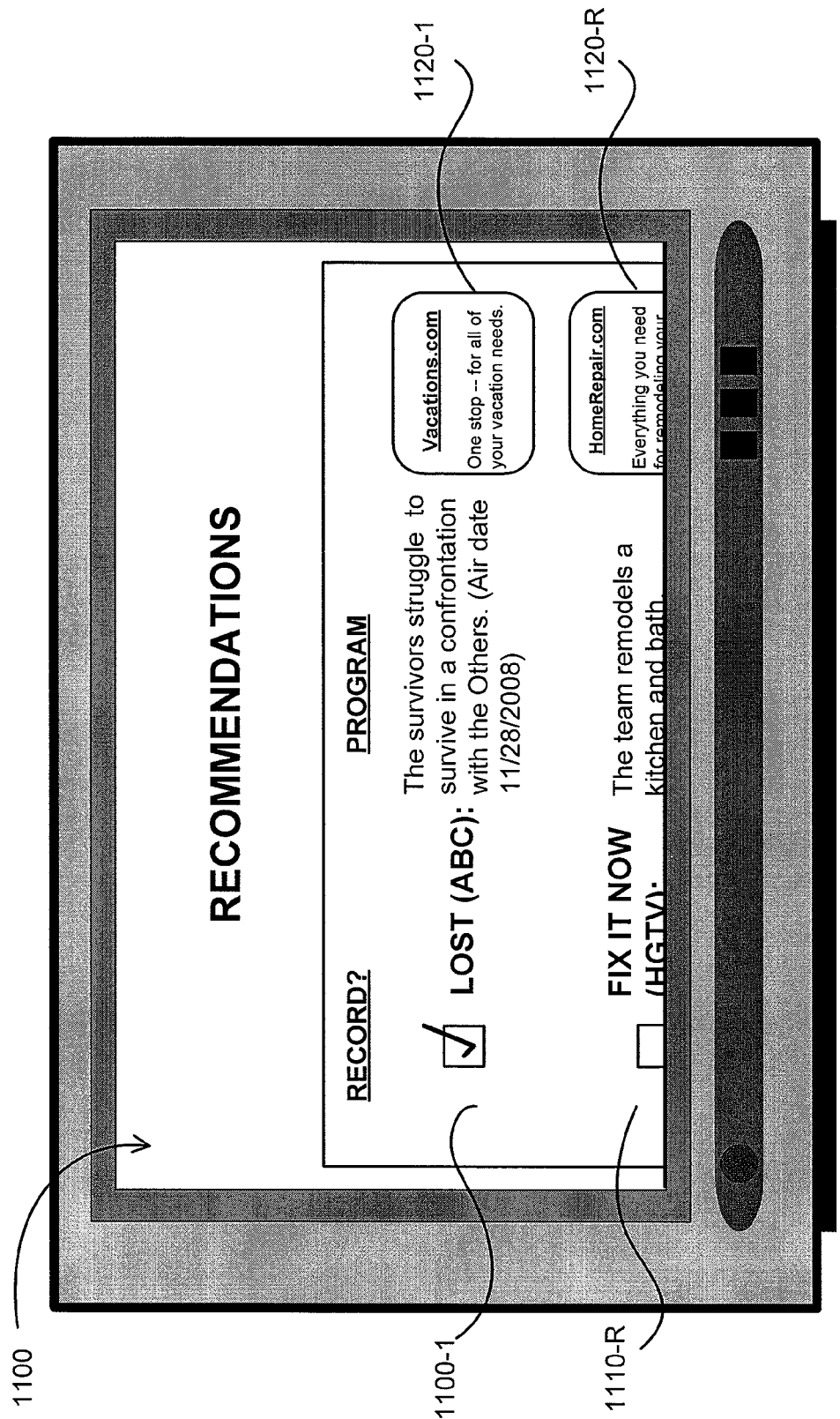

As shown in FIG. 11, assume that multiple program descriptions 1110-1, ..., 1110-R (where R≥1) are presented within a recommended programs list 1100. An advertisement 1120-1, ..., 1120-R may be presented in connection with a corresponding one of program descriptions 1110-1, ..., 1110-R. As shown in FIG. 11, the content of advertisements 1120 may relate to a content of the corresponding video programs. For example, the video program "Lost" relates to survivors of a plane crash who are living on an island, and the advertisement relates to "Vacations.com"—an online service that facilitates the arrangement of vacation plans. In one implementation, video client 260 may periodically change or rotate the advertisement that is presented. For example, if multiple advertisements were identified, video client 260 may periodically replace one of the identified advertisements with another one of the identified advertisements (e.g., every Z seconds, or each time recommended programs list is presented). While FIG. 11 shows that an advertisement is presented for each of the programs on the list, this need not be the case. An advertisement may, alternatively, be presented for one (or a subset) of the listed programs.

In one implementation, a user may configure the manner in which advertisements are presented. For example, the user may indicate how long an advertisement is presented (e.g., present an advertisement for ten seconds), when an advertisement is presented (e.g., present an advertisement only in response to the user pressing a button on remote control 270), whether to rotate advertisements (e.g., present a new advertisement every 10 seconds, present only a single advertisement, present a new advertisement each time the user activates the program guide, etc.), whether to consider the user's profile in selecting advertisements (e.g., use information regarding video programs in which the user is interested when selecting advertisements to present, use information regarding advertisements that the user has previously selected when selecting advertisements to present, etc.), the manner in which to present the advertisements (e.g., present advertisements in the program guide only, present advertisements in a data scroll, present advertisements whenever possible, etc.), or the like. By letting the user control the presentation of advertisements, the user's video program watching experience may be improved. Also, it may increase the probability of the user selecting a presented advertisement. In one implementation, the user may be paid a fee (or, more practically, a fee paid for the video program service, by the user, may be reduced) for authorizing the presentation of advertisements.

Figure 12:
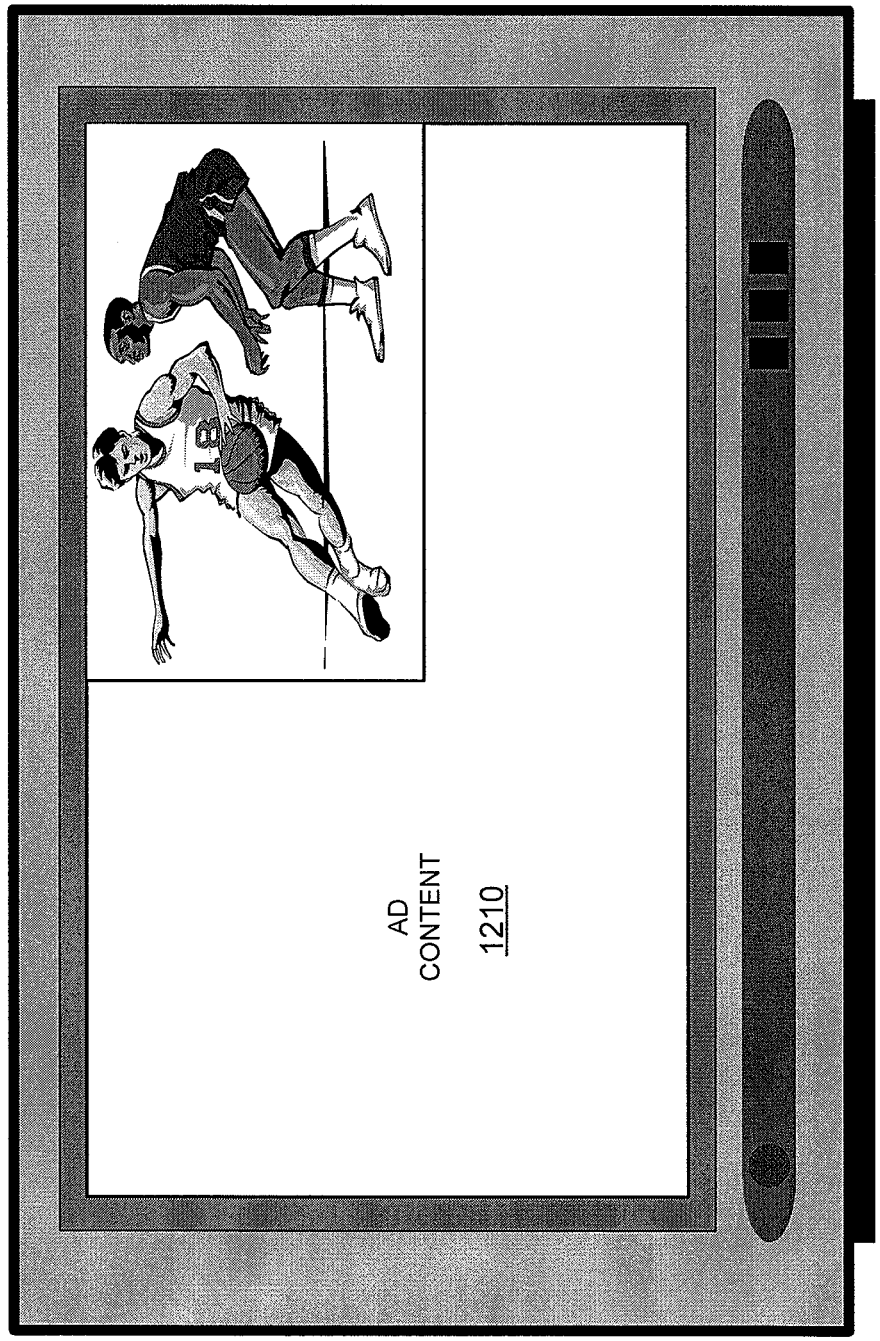

Returning to FIG. 4, selection of advertisement(s) may be detected (block 455). For example, video client 260 may permit a user to select an advertisement by, for example, pressing one or more buttons on remote control 270. In one implementation, in response to selection of an advertisement, video client 260 may present additional information to the user regarding the advertisement, as shown in FIG. 12. For example, as shown in FIG. 12, video client 260 may present the user with advertisement (ad) content 1210 associated with the selected advertisement. Advertisement content 1210 may include any type of media (e.g., video, text, audio, or a combination of video, text, and/or audio) and may, in one implementation, be interactive in nature (e.g., permitting a user to interact with the advertisement to, for example, obtain additional information, make a purchase, etc.). When the advertisement relates to another video program that is available for viewing, for example, advertisement content 1210 may present program information relating to the video program.

In another implementation, in response to selection of an advertisement, video client 260 may present an opportunity to the user regarding the advertisement. For example, when the advertisement relates to another video program, video client 260 may present the user with an opportunity to record or view the video program (e.g., schedule the video program for recording, tune to the video program on another channel, or obtain the video program as on-demand content).

Video client 260 may also record information regarding selection of an advertisement, as an advertisement selection. Video client 260 may provide information regarding an advertisement selection to data center 280 for billing purposes. As explained above, an arrangement may be made with advertisers to bill an advertiser a first amount for advertisement impressions and a second amount (typically greater than the first amount) for advertisement selections.

Figure 13:
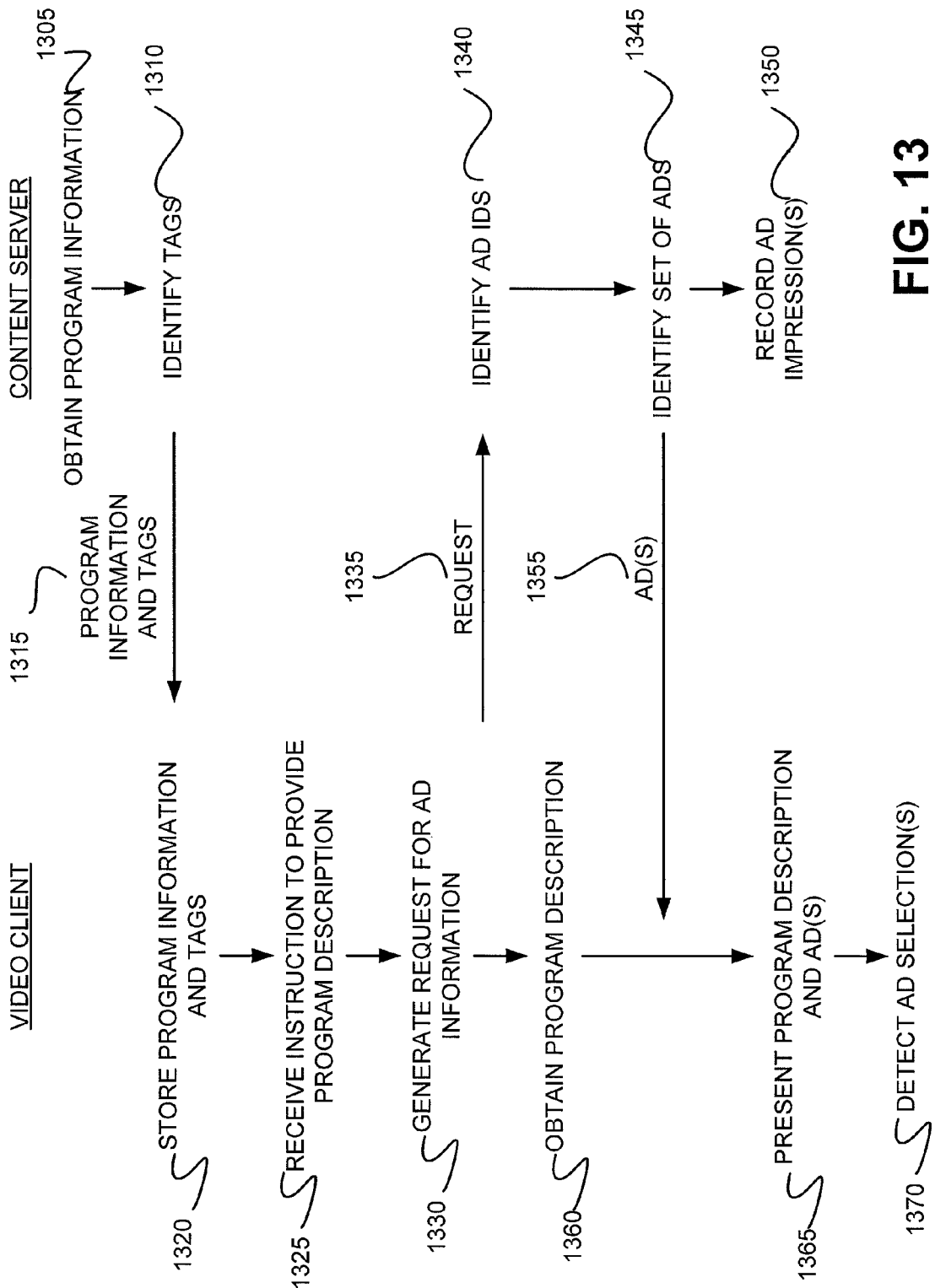
FIG. 13 is a flowchart of another exemplary process for presenting an advertisement in connection with a program description associated with a video program.

FIG. 13 is a flowchart of another exemplary process for presenting an advertisement in connection with a program description associated with a video program. In one implementation, the process of FIG. 13 may be performed by video client 260 and/or content server 230. In another implementation, the process of FIG. 13 may be performed by one or more devices either separate from, or in combination with, video client 260 and/or content server 230.

The process of FIG. 13 may begin by obtaining program information (block 1305). For example, content server 230 may retrieve program information, such as program meta-data (e.g., listings, program descriptions, etc.), from content meta-data database 215. Content server 230 may assemble the program information in a form useful for distribution to video clients, such as video client 260. Each video program, included in the program information, may have an associated program identifier. Each program identifier may uniquely identify a particular video program. Content server 230 may determine the program identifier associated with each of the video programs included in the program information.

Tags associated with the program identifiers may be identified (block 1310). A "tag," as explained above, may refer to information that identifies a subject matter of a video program. In one implementation, content server 230 may identify the tags associated with the program identifiers by, for example, performing a look-up operation in a table, such as table 500 (FIG. 5). Table 500 may reside, for example, in content meta-data database 215. Content server 230 may use a tag, included in the request, as an index into table 500. Content server 230 may read the tag(s) associated with the program identifier from tag field 520 in the corresponding record in table 500.

The program information and the tags may be outputted (block 1315). For example, content server 230 may periodically send program information and tags to a group of video clients (e.g., video client 260). The program information may include information regarding video programs available for viewing by users of the video clients. The program information and tags may be stored (block 1320). For example, video client 260 may store the program information and tags received from content server 230 in a memory.

At some point after a user turns on video display device 265, an instruction may be received to provide a program description (block 1325). For example, video client 260 may receive input, from a user, instructing video client 260 to present a program description relating to one or more video programs. In one implementation, the user may instruct video client 260 to present a program guide, a program information page, a program status bar, or a recommended programs list. The user may issue the instruction by pressing one or more buttons on remote control 270 and/or one or more buttons on video client 260.

A request for advertisement information may be generated (block 1330). For example, video client 260 may identify the video program associated with the program description. Video client 260 may include, in the generated request, the program identifier and/or the tag(s) associated with the identified video program.

In the situation where the user has instructed video client 260 to provide a program guide or a recommended programs list, video client 260 may generate a request associated with multiple video programs. For example, video client 260 may include program identifiers and/or tags, associated with a group of video programs, in the request. The program identifiers and/or tags may be associated with all or a subset of the video programs in the program guide or recommended programs list.

The request may be outputted (block 1335). For example, video client 260 may transmit the request to content server 230. Content server 230 may analyze the request to identify the program identifier(s) and/or tag(s) contained in the request.

Advertisement identifier(s), associated with the tag(s) included in the received request, may be identified (block 1340). In one implementation, content server 230 may identify advertisements associated with the tag(s) by, for example, performing a look-up operation in a table, such as table 600 (FIG. 6). Table 600 may reside, for example, in advertising content meta-data database 227. Content server 230 may use a tag as an index into table 600. Content server 230 may read the advertisement identifier(s) associated with the tag from tag field 610 in the corresponding record in table 600.

A set of advertisements may be identified (block 1345). For example, content server 230 may identify all or a subset of the advertisement(s) corresponding to the advertisement identifier(s) from table 600. Content server 230 may also prioritize or filter the identified advertisement(s). Various techniques may be used to identify, prioritize, and/or filter the advertisement(s). For example, content server 230 may use information regarding user preferences (e.g., information in user profile database 250) to identify advertisements to include in the set. Content server 230 may obtain the identified advertisement(s) from, for example, advertisement content database 225 using the advertisement identifier(s).

Information regarding the identified advertisement(s) may be recorded as impression data (block 1350). For example, content server 230 may store information regarding which advertisement(s) were identified by content server 230, and store this information, as impression data, for billing purposes. In one implementation, content server 230 may forward the impression data to data center 280.

The identified advertisement(s) may be outputted (block 1355). For example, content server 230 may transmit the identified advertisement(s) to video client 260. When there are multiple, identified advertisements that correspond to multiple video programs, content server 230 may indicate with which video program each advertisement corresponds. For example, content server 230 may transmit the identified advertisements along with the program identifiers with which the identified advertisements are associated.

The program description may be obtained (block 1360). In one implementation, video client 260 may read the program description from memory. For example, video client 260 may use the program identifier to obtain the program description.

The program description and the identified advertisement(s) may be presented (block 1365). For example, video client 260 may send information to video display device 265 to cause video display device 265 to display the program description and the identified advertisement(s). The identified advertisement(s) may be presented to the user in a number of different ways, such as in the examples described with regard to FIGS. 7-12.

Selection of advertisement(s) may be detected (block 1370). For example, video client 260 may permit a user to select an advertisement by, for example, pressing one or more buttons on remote control 270. In response to selection of an advertisement, video client 260 may present additional information to the user regarding the advertisement. For example, video client 260 may present the user with advertisement content associated with the selected advertisement. The advertisement content may include any type of media (e.g., video, text, audio, or a combination of video, text, and/or audio) and may, in one implementation, be interactive in nature (e.g., permitting a user to interact with the advertisement).

Video client 260 may also record information regarding selection of an advertisement, as an advertisement selection. Video client 260 may provide information regarding an advertisement selection to data center 280 for billing purposes. As explained above, an arrangement may be made with advertisers to bill an advertiser a first amount for advertisement impressions and a second amount (typically greater than the first amount) for advertisement selections.

Figure 14:
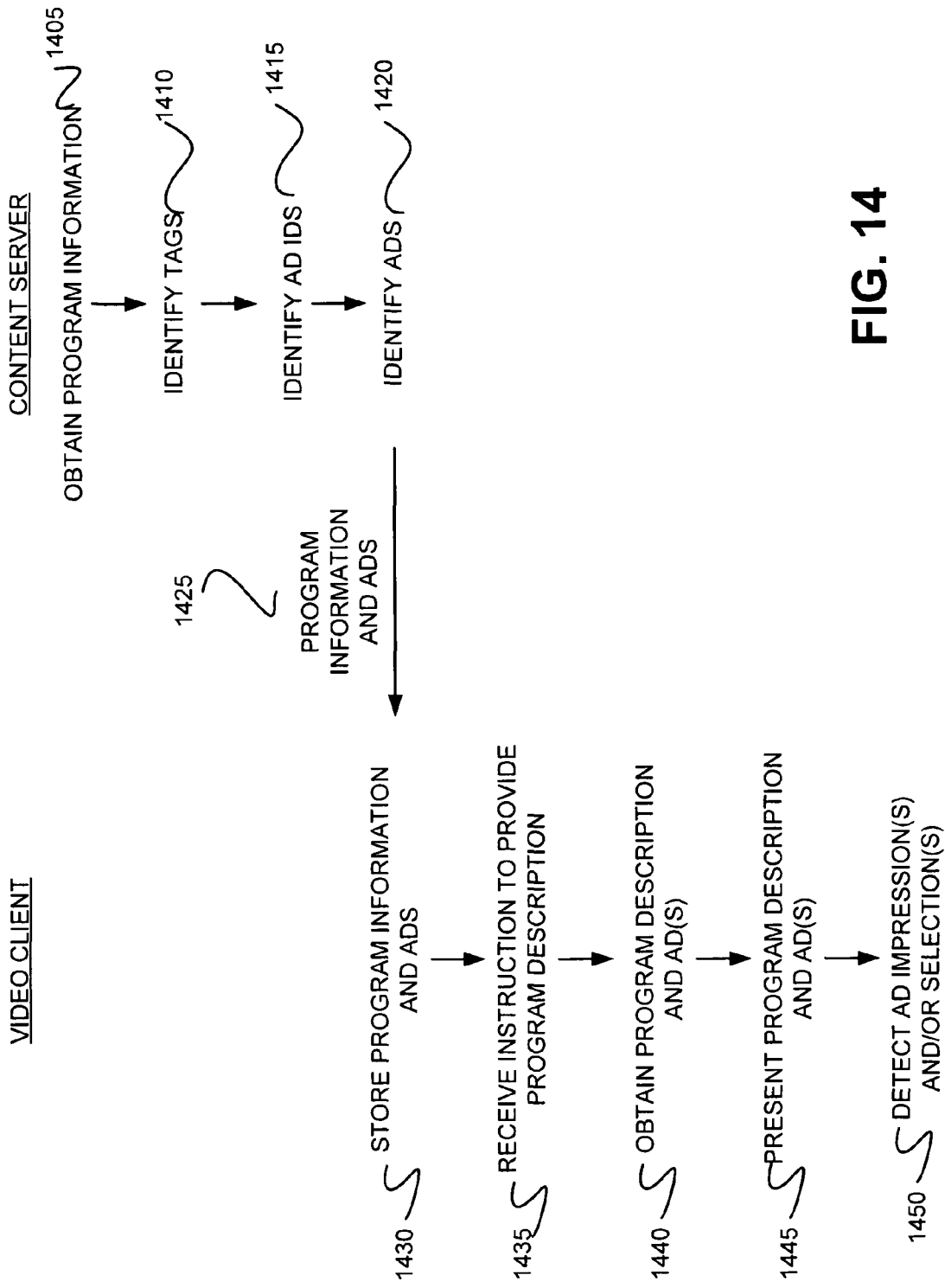
FIG. 14 is a flowchart of a further exemplary process for presenting an advertisement in connection with a program description associated with a video program.

FIG. 14 is a flowchart of a further exemplary process for presenting an advertisement in connection with a program description associated with a video program. In one implementation, the process of FIG. 14 may be performed by video client 260 and/or content server 230. In another implementation, the process of FIG. 14 may be performed by one or more devices either separate from, or in combination with, video client 260 and/or content server 230.

The process of FIG. 14 may begin by obtaining program information (block 1405). For example, content server 230 may retrieve program information, such as program meta-data (e.g., listings, program descriptions, etc.), from content meta-data database 215. Content server 230 may assemble the program information in a form useful for distribution to video clients, such as video client 260. Each video program, included in the program information, may have an associated program identifier. Each program identifier may uniquely identify a particular video program. Content server 230 may determine the program identifier associated with each of the video programs included in the program information.

Tags associated with the program identifiers may be identified (block 1410). A "tag," as explained above, may refer to information that identifies a subject matter of a video program. In one implementation, content server 230 may identify the tags associated with the program identifiers by, for example, performing a look-up operation in a table, such as table 500 (FIG. 5). Table 500 may reside, for example, in content meta-data database 215. Content server 230 may use a tag, included in the request, as an index into table 500. Content server 230 may read the tag(s) associated with the program identifier from tag field 520 in the corresponding record in table 500.

Advertisement identifiers, associated with the tags, may be identified (block 1415). In one implementation, content server 230 may identify advertisements associated with the tags by, for example, performing a look-up operation in a table, such as table 600 (FIG. 6). Table 600 may reside, for example, in advertising content meta-data database 227. Content server 230 may use a tag as an index into table 600. Content server 230 may read the advertisement identifiers associated with the tag from tag field 610 in the corresponding record in table 600.

Advertisements may be identified (block 1420). For example, content server 230 may identify all or a subset of the advertisements corresponding to the advertisement identifiers from table 600. Content server 230 may also prioritize or filter the identified advertisement(s). Various techniques may be used to identify, prioritize, and/or filter the advertisements. Content server 230 may obtain the identified advertisements from, for example, advertisement content database 225 using the advertisement identifiers.

The program information and the identified advertisements may be outputted (block 1425). For example, content server 230 may periodically send program information and advertisements to a group of video clients (e.g., video client 260). The program information may include information regarding video programs available for viewing by users of the video clients. There may also be information that relates the identified advertisements to the program information (or video programs) with which the identified advertisements are associated. The program information and the advertisements may be stored (block 1430). For example, video client 260 may store the program information and advertisements, received from content server 230, in a memory.

At some point after a user turns on video display device 265, an instruction may be received to provide a program description (block 1435). For example, video client 260 may receive input, from a user, instructing video client 260 to present a program description relating to one or more video programs. In one implementation, the user may instruct video client 260 to present a program guide, a program information page, a program status bar, or a recommended programs list. The user may issue the instruction by pressing one or more buttons on remote control 270 and/or one or more buttons on video client 260.

The program description and related advertisement(s) may be obtained (block 1440). In one implementation, video client 260 may read the program description from memory. For example, video client 260 may use the program identifier to obtain a program description. Video client 260 may also identify an advertisement that is associated with the program description. Video client 260 may identify the advertisement from the advertisements received from content server 230. In one implementation, video client 260 may use information regarding user preferences (e.g., information from user profile database 250, or stored locally) to identify one or more of the advertisements.

The program description and the identified advertisement(s) may be presented (block 1445). For example, video client 260 may send information to video display device 265 to cause video display device 265 to display the program description and the identified advertisement(s). The identified advertisement(s) may be presented to the user in a number of different ways, such as in the examples described with regard to FIGS. 7-12.

Presentation and/or selection of the advertisement(s) may be detected (block 1450). For example, video client 260 may record information regarding the presented advertisement(s) as impression data. Video client 260 may also record information regarding selected advertisement(s) as selection data. For example, video client 260 may permit a user to select an advertisement by, for example, pressing one or more buttons on remote control 270. In response to selection of an advertisement, video client 260 may present additional information to the user regarding the advertisement. For example, video client 260 may present the user with advertisement content associated with the selected advertisement. The advertisement content may include any type of media (e.g., video, text, audio, or a combination of video, text, and/or audio) and may, in one implementation, be interactive in nature (e.g., permitting a user to interact with the advertisement).

Video client 260 may provide information regarding advertisement impressions and/or selections to data center 280 for billing purposes. As explained above, an arrangement may be made with advertisers to bill an advertiser a first amount for advertisement impressions and a second amount (typically greater than the first amount) for advertisement selections.

Implementations described herein may provide advertisements in connection with program descriptions. The content of the advertisements may be related (relevant) to the content of the video programs, associated with the program descriptions, with which the advertisements are presented. By presenting users with advertisements that are related to the video programs in which the users are interested, the users are more likely to view and/or select the advertisements. Also, presenting the users with advertisements adjacent to the program descriptions (e.g., see FIG. 7) increases the likelihood that users will view and/or select the advertisements because users tend to look more closely at the area of the screen containing a program description than at other areas of the screen when a program description is presented.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4, 13, and 14, the order of the blocks may be modified in other implementations. Further, non-dependent blocks may be performed in parallel.

While several ways of presenting an advertisement in connection with a program description have been described above, other ways are possible. For example, an advertisement may be presented within a pop-up window presented on top of or visually near the program description. Alternatively, an advertisement may be presented upon exiting the mechanism (e.g., program guide, program information page, program status bar, or recommended programs list) containing the program description. For example, upon exiting the program guide, but prior to presenting the video program, an advertisement can be presented to the user. In other words, the advertisement may be presented during the time between terminating the presentation of the program guide and the starting the presentation of the video program.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A device connected to a video display device, the device comprising:
   a memory to store program information associated with a plurality of video programs,
      the program information including:
         a program description associated with a particular video program of the plurality of video programs,
         a title associated with the particular video program, and
         a particular program identifier associated with the particular video program,
            the particular program identifier uniquely identifying the particular video program; and
   a processor to:
      generate a request for advertisements that are related to the particular video program and another video program of the plurality of video programs,
         the particular video program being different than the other video program,
         the request including the particular program identifier and another program identifier that is associated with the other video program,
      transmit the request to a content server,
      receive, from the content server and based on transmitting the request, a first plurality of advertisements that is related to the particular video program,
         information identifying the plurality of advertisements being associated with information identifying a subject matter of the particular program,
            the information identifying the plurality of advertisements and the information identifying the subject matter of the particular program being included in a data structure associated with the content server,
            the information identifying the subject matter of the particular program being associated with the particular program identifier,
      receive a second plurality of advertisements that is related to the other video program based on the request,
         the second plurality of advertisements being different than the first plurality of advertisements,
      obtain, from the memory and using the particular program identifier, the program description and the title, and
      present the title, the program description, the first plurality of advertisements that is related to the particular video program, and the particular video program to the video display device,
         when presenting the title, the program description, the first plurality of advertisements, and the particular video program, the processor is to at least one of:
            present a first advertisement, of the first plurality of advertisements, adjacent to the title and the program description on a screen of the video display device, or
            present a second advertisement, of the first plurality of advertisements, adjacent to the title and the program description on the screen of the video display device,
         the title, the program description, the first advertisement, and the second advertisement being presented over a portion of the particular video program, presented on the screen, while the particular video program is playing on the video display device,
            the portion being less than an entirety of the particular video program presented on the screen,
         the second plurality of advertisements being presented with the other video program.

2. The device of claim 1, where the program description includes at least one of:
   a program guide,
   a program information page,
   a program status bar, or
   a recommended programs list that contains the program description.

3. The device of claim 1, where the processor is further to:
   detect a selection involving the first advertisement or the second advertisement, and
   provide, based on the selection, additional information regarding the first advertisement or the second advertisement.

4. The device of claim 1, where the processor is further to:
   record presentation of the first advertisement or the second advertisement as impression data, and
   provide the impression data to a billing system for billing an advertiser associated with the first advertisement or the second advertisement.

5. The device of claim 1, where the device is a set top box, the video display device is a television, and the particular video program is a television program.

6. A non-transitory computer-readable medium storing instructions, the instructions comprising:
   one or more instructions that, when executed by a processor, cause the processor to generate a request for a first advertisement that is related to content of a first video program and for a second advertisement that is related to content of a second video program,
   the request including:
      a first program identifier that identifies the first video program, and
      a second program identifier that identifies the second video program;
   one or more instructions that, when executed by the processor, cause the processor to output the request;
   one or more instructions that, when executed by the processor, cause the processor to receive, based on the request, the first advertisement and the second advertisement,
      information identifying the first advertisement being associated, in a data structure, with information that identifies a subject matter of the first video program,
      the information that identifies the subject matter of the first video program being associated with the first program identifier;
   one or more instructions that, when executed by the processor, cause the processor to present a first program description associated with the first video program, a first title associated with the first video program, the first advertisement, and the first video program to a video display device for first concurrent presentation on a screen of the video display device,
      the first program description, the first title, and the first advertisement being presented over a portion of the video program, presented on the screen, while the first video program is playing on the video display device,
      the portion being less than an entirety of the first video program presented on the screen; and
   one or more instructions that, when executed by the processor, cause the processor to present a second program description associated with the second video program, a second title associated with the second video program, the second advertisement, and the second video program to the video display device for second concurrent presentation on the screen of the video display device.

7. The non-transitory computer-readable medium of claim 6, where the first advertisement includes information identifying a business entity related to the content of the first video program, and
   where the one or more instructions that cause the processor to generate the request for the first advertisement and the second advertisement include:
      one or more instructions that, when executed by the processor, cause the processor to identify a tag associated with the first program identifier,
         the tag corresponding to the information that identifies the subject matter of the first video program,
         the request for the first advertisement and for the second advertisement including the tag.

8. The non-transitory computer-readable medium of claim 6, where the instructions further comprise:
   one or more instructions that, when executed by the processor, cause the processor to detect a selection involving the first advertisement;
   one or more instructions that, when executed by the processor, cause the processor to record the selection as selection data; and
   one ore more instructions that, when executed by the processor, cause the processor to provide the selection data to a billing system for billing an advertiser associated with the first advertisement.

9. The non-transitory computer-readable medium of claim 6, where the one or more instructions or present the first program description, the first title, the first advertisement, and the first video program include:
   one or more instructions to present the first advertisement on the screen of the video display device during a period of time;
   where the instructions further comprise;
      one or more instructions that, when executed by the processor, cause the processor to receive, based on the request, another advertisement related to the content of the first video program; and
      one or more instructions that, when executed by the processor, cause the processor to present the other advertisement on the screen of the video display device after the period of the time,
         the other advertisement replacing the first advertisement.

10. A method performed by one or more devices, the method comprising:
   identifying, by the one or more devices, a program description that includes a program identifier associated with a video program,
      the program identifier, associated with the video program, uniquely identifying the video program;
   identifying, by the one or more devices and using the program identifier, a first plurality of tags corresponding to a content of the video program,
      the first plurality of tags being identified in a first data structure that associates the first plurality of tags with the program identifier,
      each of the first plurality of tags identifying a subject matter of the video program;
   identifying, by the one or more devices and using the first plurality of tags, information identifying a first plurality of advertisements,
      the information identifying the first plurality of advertisements being identified in a second data structure that associates the information identifying the first plurality of advertisements with the first plurality of tags;
   obtaining, by the one or more devices and based on the plurality of tags, the first plurality of advertisements,
      obtaining the first plurality of advertisements including:
         generating a request, for advertisements, that includes the first plurality of tags corresponding to the content of the video program and a second plurality of tags corresponding to content of another video program, the second plurality of tags being associated with another identifier that identifies the other video program, outputting the request on a network, and receiving the first plurality of advertisements and a second plurality of advertisements from the network based on the request;

presenting, by the one or more devices, the program description for display on a video display device;

presenting, by the one or more devices, the video program for display on the video display device;

presenting, by the one or more devices, a first advertisement, of the plurality of advertisements, for display adjacent to the program description and the video program on the video display device, the first advertisement being presented during a period of time; and presenting, by the one or more devices, a second advertisement, of the plurality of advertisements, adjacent to the program description and the video program for display on the video display device after the period of time, the second advertisement replacing the first advertisement, the second plurality of advertisements being presented with the other video program.

11. The method of claim 10, where presenting the program description includes presenting the program description as one of a plurality of program descriptions in a program guide, and where the method further includes:

presenting an advertisement in connection with each group of program descriptions of a plurality of groups of the plurality of program descriptions in the program guide.

12. The method of claim 10, further comprising:

presenting the second plurality of advertisements, a program description associated with the other video program, and the other video program for display on the video display device.

13. The method of claim 10, further comprising: further comprising:

identifying, by the one or more devices, a plurality of advertisement identifiers associated with each tag of the first plurality of tags, each advertisement identifier, of the plurality of advertisement identifiers, corresponding to a different advertisement; and selecting, by the one or more devices, a set of advertisements from the different advertisements corresponding to the plurality of advertisement identifiers, the set of advertisements corresponding to the plurality of advertisements.

14. The device of claim 1, where the processor is further to:

present a program description associated with the other video program, the second plurality of advertisements, and the other video program to the video display device.

15. The device of claim 14, where the processor is to present to the video display device:

a title associated with the other video program, and at least one advertisement of the second plurality of advertisements.

16. The non-transitory computer-readable medium of claim 6, where the one or more instructions that cause the processor to receive the first advertisement include one or more instructions that, when executed by the processor, cause the processor to receive a plurality of advertisements that is related to the first video program, the plurality of advertisements including the first advertisement.

17. The non-transitory computer-readable medium of claim 16, where one of the plurality of advertisements includes:

information identifying another video program, and an option to record the other video program, the other video program being recorded when the option is selected.

18. The method of claim 13, where selecting the set of advertisements from the different advertisements corresponding to the plurality of advertisement identifiers includes:

selecting the set of advertisements based on preferences associated with a user of the video display device.

19. The method of claim 13, further comprising:

storing information associated with the selected set of advertisements; and using the stored information associated with the selected set of advertisements for billing one or more advertisers associated with the selected set of advertisements.

20. The method of claim 10, where presenting the program description includes presenting the program description as one of a plurality of program descriptions in a program guide, and where the method further comprises:

detecting a selection of the one of the plurality of program descriptions, where the first plurality of advertisements is obtained based on detecting the selection of the one of the plurality of program descriptions;

detecting a selection of another program description of the plurality of program descriptions, the other program description identifying another video program;

obtaining one or more advertisements related to content of the other video program based on detecting the selection of the other program description; and presenting one or more advertisements, adjacent to the other program description, for display on the video display device.

* * * * *